United States Patent
Hamaguchi et al.

(10) Patent No.: US 6,809,771 B1
(45) Date of Patent: Oct. 26, 2004

(54) DATA INPUT APPARATUS HAVING MULTIPLE LENS UNIT

(75) Inventors: Takayuki Hamaguchi, Takarazuka (JP); Takuto Joko, Toyonaka (JP); Satoru Hirose, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 946 days.

(21) Appl. No.: 09/599,442

(22) Filed: Jun. 22, 2000

(30) Foreign Application Priority Data

Jun. 29, 1999 (JP) .......................................... 11-182735

(51) Int. Cl.$^7$ .............................................. H04N 5/225
(52) U.S. Cl. ............. 348/335; 348/333.11; 348/333.12; 348/42
(58) Field of Search .................... 348/207.99, 218.1, 348/207.1, 220.1, 222.1, 239, 335, 343, 344, 374, 375, 36, 38, 39, 42, 43, 51, 52, 54, 55, 143, 65, 47, 333.01, 333.02, 333.05, 333.09, 333.11, 333.12, 333.08, 462

(56) References Cited

U.S. PATENT DOCUMENTS

| | | | | |
|---|---|---|---|---|
| 4,571,628 A | * | 2/1986 | Thornton | ................ 348/333.08 |
| 4,751,570 A | * | 6/1988 | Robinson | ...................... 348/47 |
| 5,907,434 A | * | 5/1999 | Sekine et al. | ................ 359/462 |
| 6,094,215 A | * | 7/2000 | Sundahl et al. | ................ 348/42 |
| 6,271,876 B1 | * | 8/2001 | McIntyre et al. | ............. 348/46 |

FOREIGN PATENT DOCUMENTS

| | | | | |
|---|---|---|---|---|
| JP | 09-074572 | * | 3/1997 | .......... H04N/5/335 |
| JP | 09-305796 | | 11/1997 | |

* cited by examiner

Primary Examiner—Tuan Ho
(74) Attorney, Agent, or Firm—Burns, Doane, Swecker & Mathis, L.L.P.

(57) ABSTRACT

A data input apparatus having a multiple lens unit comprising an image input device for inputting two-dimensional images of a photographic subject from a plurality of mutually different viewpoint positions, a display device, and a display controller for displaying on the display device an overlay image formed by mutually superimposing a plurality of input two-dimensional images.

19 Claims, 13 Drawing Sheets

DATA INPUT APPARATUS HAVING MULTIPLE LENS UNIT

CROSS-REFERENCE TO RELATED APPLICATIONS

This application is based on Patent Application No. 11-182735 filed in Japan, the content of which is hereby incorporated by reference.

BACKGROUND OF THE INVENTION

1. Field of the Invention

The present invention relates to a data input apparatus having a multiple lens unit for obtaining three-dimensional data.

2. Description of the Related Art

Heretofore, one data input apparatus having a multiple lens unit is known as a passive type three-dimensional data input apparatus. The data input apparatus having a multiple lens unit is provided with a plurality of input units for obtaining two-dimensional images, and a calculation unit for calculating three-dimensional data based on the plurality of obtained two-dimensional images.

Generation of three-dimensional data using this apparatus specifies one image among the plurality of two-dimensional images as a standard image. All coordinate points within a range representing the photographic subject in the standard image are used in determining corresponding coordinate points in the other two-dimensional images. The position of a point in three-dimensional space is determined according to the stereo view principle and is the basis of the correspondence relationship of coordinate points (corresponding points) The aggregate position data of the determined points are the three-dimensional data of the photographic subject.

In the conventional apparatus described above, when a region present in one two-dimensional image is not present in another two-dimensional image, the correspondence points between the two images cannot be determined. Furthermore, erroneous points may be designated as correspondence points. In such instances, the three-dimensional data include the erroneous points, and a truly accurate three-dimensional image cannot be formed.

Accordingly, the precision of the search for corresponding points must be improved in order to reconstruct the three-dimensional shape with greater accuracy. For this reason, occlusion (angles which define an area where neither sensor senses the photographic object) must be eliminated as far as possible in the region representing the photographic subject of a plurality of two-dimensional images. Two-dimensional images having relatively small parallax must be obtained between the plurality of two-dimensional images so as to avoid large shifts in the coordinates representing viewing focus points of the photographic subject.

Art for minimizing parallax in stereo cameras is described in an apparatus disclosed in Japanese Laid-Open Patent No. HEI 9-74572. This conventional device displays right and left two-dimensional images on respective screens, and controls parallax between right and left two-dimensional images on the screen via special circuits by providing special circuits such as a parallax calculator, display screen controller, readout pulse controller and the like. In this conventional device, however, the circuitry is complex because parallax is controlled by calculations performed by the special circuits.

In view of these disadvantages, the present invention performs photography while confirming photographic conditions so as to minimize parallax without occlusion. An object of the present invention is to provide a data input apparatus having a multiple lens unit capable of improving the precision of the search for correspondence points and improving accuracy when reconstructing a three-dimensional image.

SUMMARY OF THE INVENTION

The present invention attains these objects by providing a data input apparatus having a multiple lens unit comprising an image input device for inputting two-dimensional images of a photographic subject from a plurality of mutually different viewpoint positions; a display for displaying the two-dimensional image input by the image input device; and a controller for displaying on the display an image formed by mutually overlaying a plurality of two-dimensional images input by the image input device.

This data input apparatus having a multiple lens unit is further provided with a calculator for calculating three-dimensional data of a photographic subject based on the two-dimensional images.

The image input device is capable of variable baseline length.

The image input device is capable of variable photographic direction.

The controller simultaneously displays a plurality of two-dimensional images on the display.

The controller alternatingly displays a plurality of two-dimensional images on the display at fixed periods.

The data input apparatus having a multiple lens unit is provided with an extractor for extracting from the two-dimensional images the areas targeted as the object of three-dimensional data calculation in the photographic subject, wherein the controller displays on the display an image formed by mutually overlaying the extracted two-dimensional images.

BRIEF DESCRIPTION OF THE DRAWINGS

In the following description, like parts are designated by like reference numbers throughout the several drawings.

DETAILED DESCRIPTION OF THE PREFERRED EMBODIMENTS

First Embodiment

Figure 1:
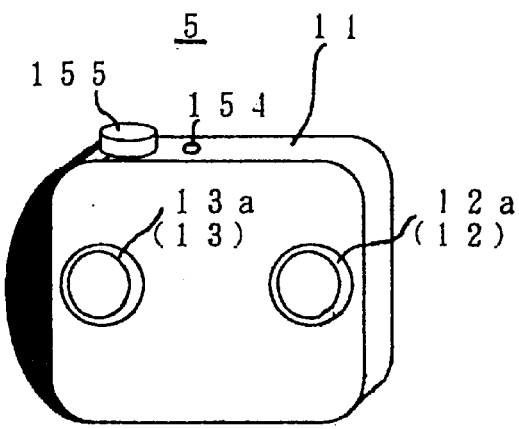
FIG. 1 is a perspective view of a camera having a multiple lens input unit of a first embodiment of the present invention.
Figure 2:
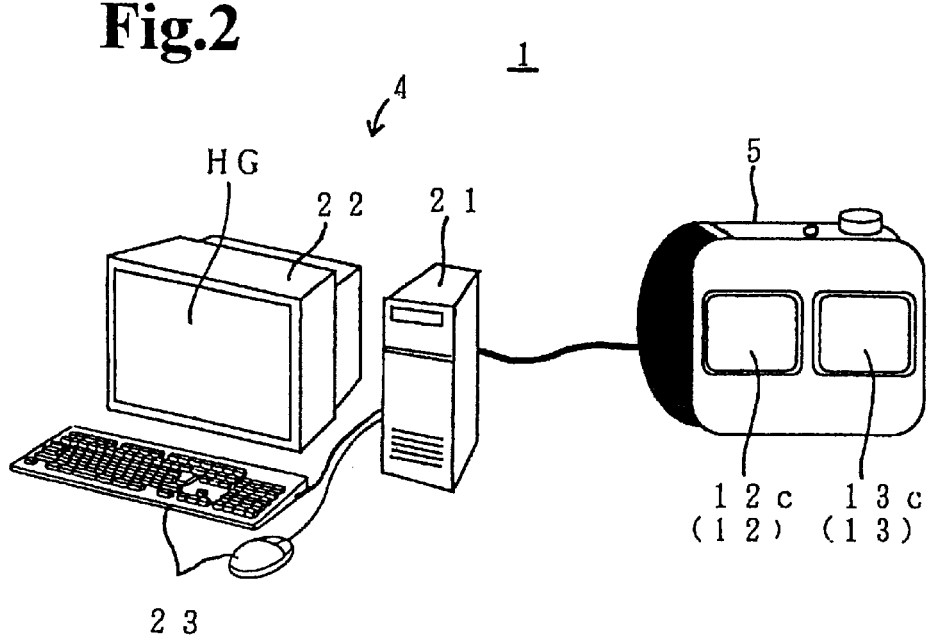
FIG. 2 shows an example of the construction of a three-dimensional data generator incorporated in the camera having a multiple lens input unit.
Figure 3:
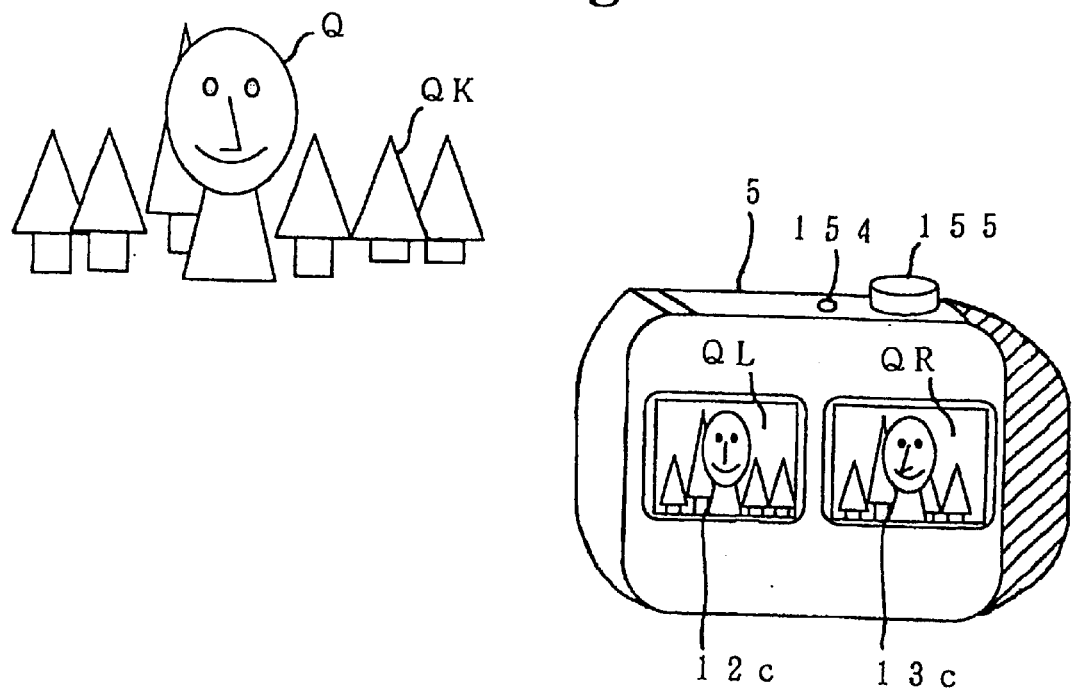
FIG. 3 conceptually shows the conditions when a subject is photographed using the camera having a multiple lens input unit.

FIG. 1 is a perspective view of a camera 5 having a multiple lens input unit of a first embodiment of the present invention. FIG. 2 shows an example of the construction of a three-dimensional data generator 1 incorporated in the camera 5 having a multiple lens input unit. FIG. 3 conceptually shows the conditions when a subject Q is photographed using the camera 5 having a multiple lens input unit.

As shown in FIG. 1, the camera 5 having a multiple lens input unit is provided with a camera body 11, image input units 12 and 13 respectively having taking lenses 12a and 13a, a position alignment button 154 (described later), and a shutter button 155. A processing circuit 15 (FIG. 5) is built into the camera 5 having a multiple lens input unit.

As shown in FIG. 2, the three-dimensional data generator 1 comprises an information processing device 4 and the camera 5 having a multiple lens input unit. The image processing device 4 comprises a processing device 21, display device 22 having a display surface HG, and an input device 23 generally provided with a keyboard and mouse. Built into the processing device 21 are a central processing unit (CPU), random access memory (RAM), read only memory (ROM), and other peripheral elements such as an interface device, hard disk, floppy disk, CD-ROM device, modem and the like. A personal computer and the like in which are installed suitable programs may be used as the image processing device 4.

The camera 5 having a multiple lens input unit is provided with display devices 12c and 13c comprising liquid crystal panels or the like for displaying the photographed two-dimensional images QL and QR, and the overlaid images described later, as shown in FIG. 2.

Data can be transmitted between the camera 5 having a multiple lens input unit and the information processing device 4. The two-dimensional image data input to the camera 5 having a multiple lens input unit can be displayed in the information processing device 4. The information processing device 4 generates three-dimensional image data based on the two-dimensional image data input to the camera 5 having a multiple lens input unit, and displays the generated three-dimensional image data on the display screen HG.

As shown in FIG. 3, the photographic subject Q is captured with parallax via two taking lenses 12a and 13a together with the background QK, and displayed as two-dimensional images QL and QR on the respective display devices 12c and 13c. A search for correspondence points is conducted as a three-dimensional data generation pre-process based on the two-dimensional images QL and QR. That is, one image among the two two-dimensional images QL and QR is designated as a standard image, and correspondence points are determined in the other two-dimensional image corresponding to all coordinate points within a region representing the photographic subject Q in the standard image. Three-dimensional data are calculated by the stereo view principle based on the determined correspondence points. In the present invention, the search for these points of correspondence is referred to as a correspondence point search.

Figure 4:
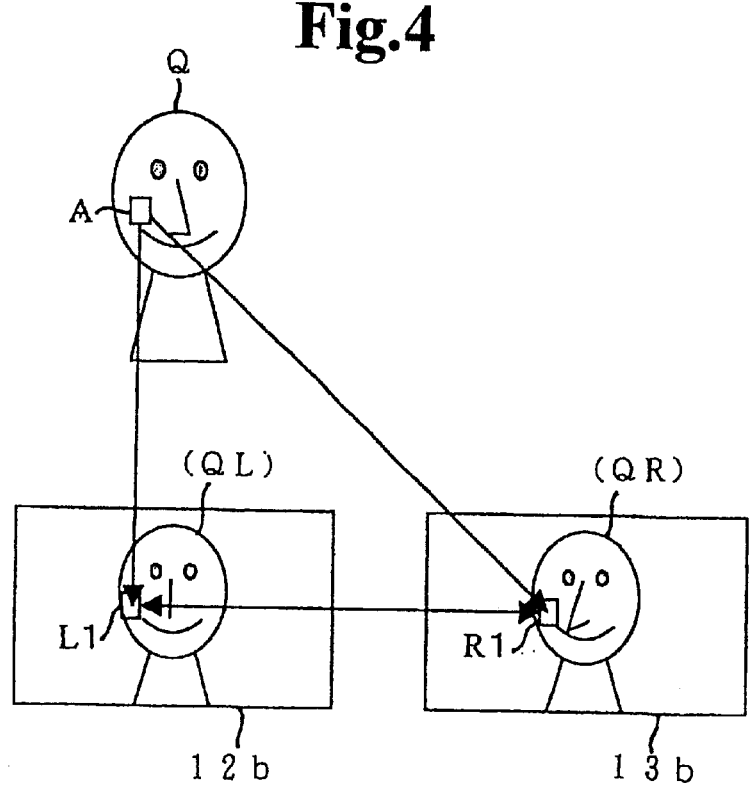
FIG. 4 illustrates the concept of the correspondence point search.

FIG. 4 illustrates the concept of the correspondence point search.

In FIG. 4, the image of the photographic subject Q is formed on the image sensing surfaces of the image sensor elements 12b and 13b provided on the image input units 12 and 13. The two-dimensional image QL formed on the left image sensor element 12b is designated as the standard image. The two-dimensional images QL and QR obtained by the image sensor elements 12b and 13b are identical to the two-dimensional images QL and QR displayed on the display devices 12c and 13c. The correspondence point search is accomplished in the manner described below.

When an optional point on the photographic subject Q is designated as a focus point A, the correspondence point search is an operation for determining whether a point L1 representing the focus point A on the image sensing surface of the image sensor element 12b capturing the standard image corresponds to a point at which coordinates on the image sensing surface of the other image sensor element 13b. In the correspondence point search, well-known conventional methods may be used, e.g., slope method or correlation method, using the luminance of the two-dimensional images QL and QR. By using such methods, it can be understood that the point L1 on the image sensing surface of the image sensor element 12b in FIG. 4 corresponds to the point R1 on the image sensing surface of the image sensor element 13b. All points on the photographic subject Q are subjected to this correspondence point search to find the position of all points on a three-dimensional coordinate system, so as to determine the three-dimensional shape of the photographic subject Q.

When determining the correspondence point relative to each point on the standard image in the correspondence point search, the greater the reduction of the difference (parallax) in the relative positions of the focus point A in the two-dimensional images QL and QR, the more easily are the correspondence points accurately determined. For this reason, the camera 5 having a multiple lens input unit of the present invention is capable of photographing at a position which minimizes the parallax of each point of the photographic subject Q within the angle of field.

Figure 5:
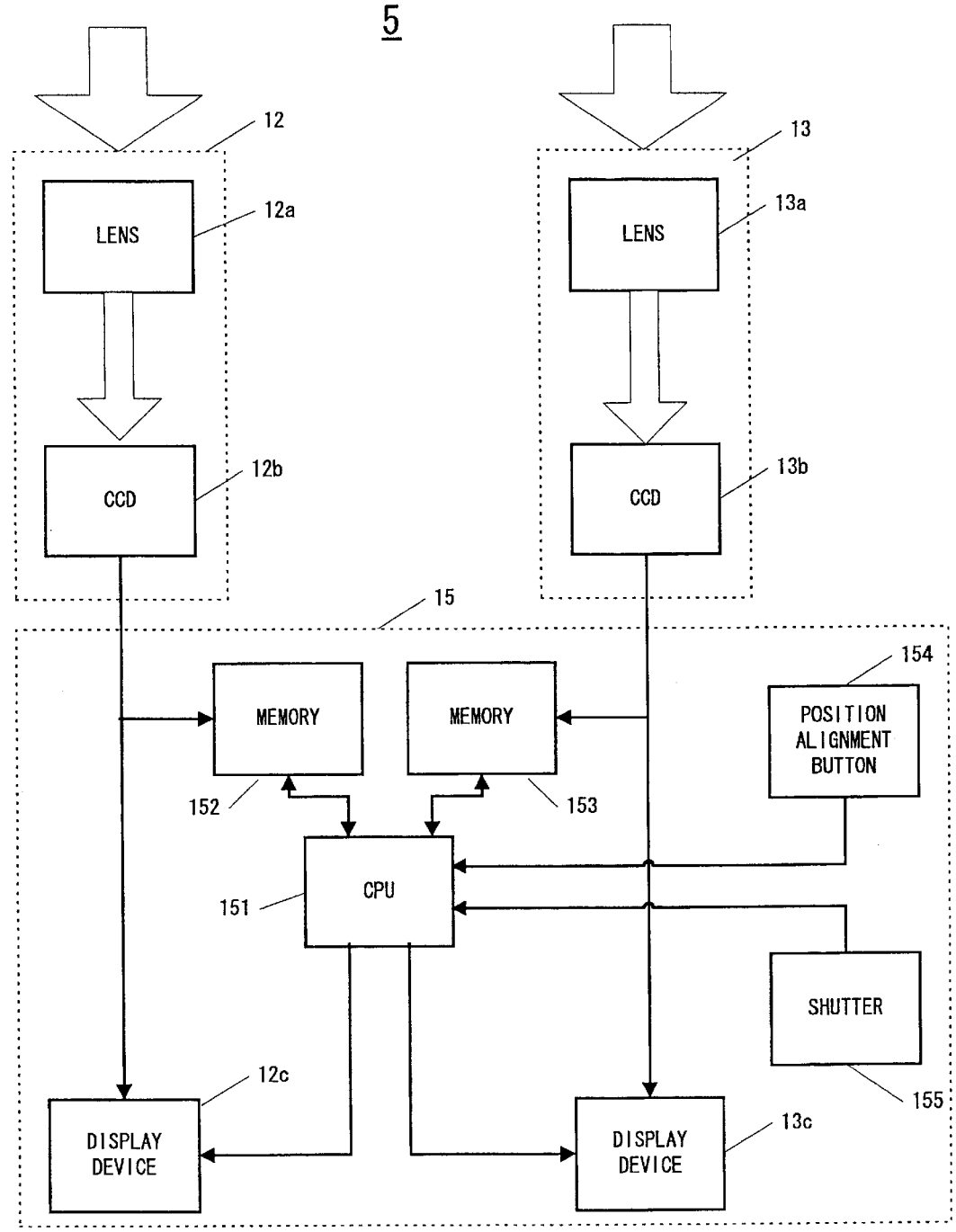
FIG. 5 is a block diagram showing the structure of the camera having a multiple lens input unit.

FIG. 5 is a block diagram showing the structure of the camera 5 having a multiple lens input unit. FIG. 6 shows an example of an image displayed on the display devices 12c and 13c. FIG. 7 is a flow chart briefly showing the operation of the camera 5 having a multiple lens input unit.

In FIG. 5, the camera 5 having a multiple lens input unit comprises image input units 12 and 13, processing circuit 15 and the like as described above. The image input units 12 and 13 are provided with taking lenses 12a and 13a, and image sensor elements 12b and 13b. Monochrome or color charge-coupled devices (CCD) may be used as the image sensor elements 12b and 13b. The processing circuit 15 comprises a CPU 151, memories 152 and 153, position alignment button 154, shutter button 155, and display devices 12c and 13c. Although:not shown in the drawing, various other devices also are provided including various types of buttons for normal operation of the camera 5 having a multiple lens input unit.

Figure 6A:
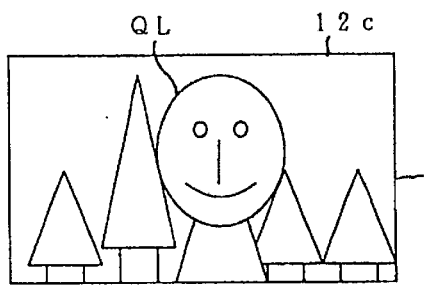
FIGS. 6(*a*), 6(*b*) and 6(*c*) show an example of an image displayed on the display device of the first embodiment.
Figure 6A:
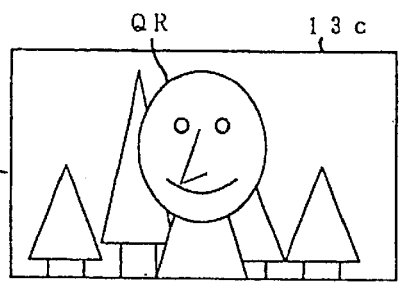
Figure 6B:
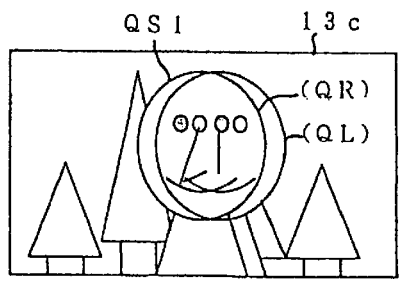
Figure 7:
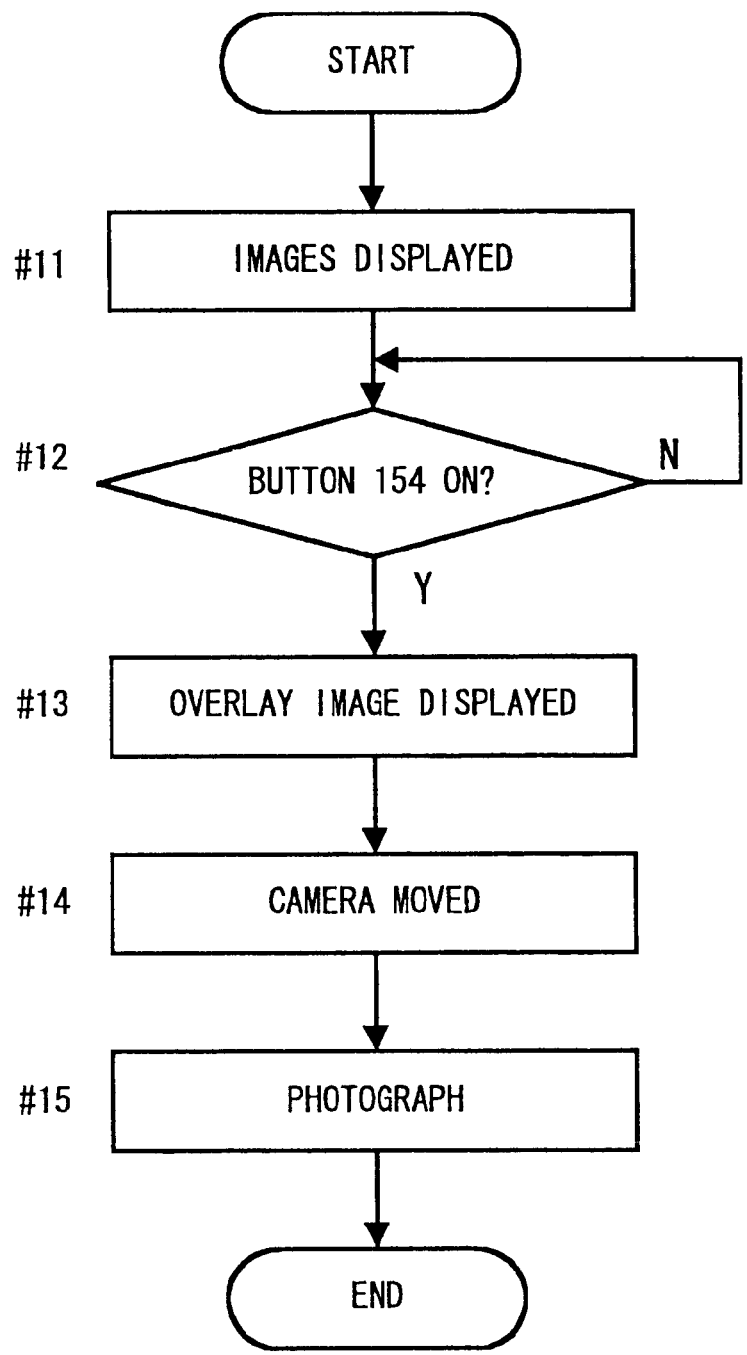
FIG. 7 is a flow chart briefly showing the operation of the camera having a multiple lens input unit of the first embodiment.

Normally, as shown in FIG. 6(a), the two-dimensional image QL input to the image sensor element 12b is displayed on the display device 12c, and the two-dimensional image QR input to the image sensor element 13b is displayed on the display device 13c. When the position alignment button 154 is pressed, the two two-dimensional images QL and QR are superimposed as shown in FIG. 6(b), and the obtained overlay image QS is displayed on the display device 13c.

The overlay process is performed in the manner described below. The image data input to the image sensor elements 12b and 13b are temporarily stored in memories 152 and 153. The image data stored in the memories 152 and 153 are read out by the CPU 151, and image data are generated at ½ the luminance value of the respective data, then the generated image data are displayed on the display device 13c at a position identical to the original position. In the overlay image QS1 shown in FIG. 6(b), the two two-dimensional images QL and QR are mutually and slightly dislocated, with large parallax and the possibility of occlusion.

A user reduces the dislocation between the two two-dimensional images QL and QR while viewing the overlay image QS displayed on the display device 13c. The methods described below are considered as methods for reducing image dislocation:

(1) Without moving the camera 5 having a multiple lens input unit relative to the photographic object Q, the camera 5 oscillates to change the photography direction;

(2) The camera 5 having a multiple lens input unit is moved closer to or farther away from the photographic subject Q to change the distance; and (3) The camera 5 having a multiple lens input unit is moved so as to describe an arc while facing the photographic subject Q and maintaining the distance therebetween.

Consider the following methods if permitted by the construction of the camera 5 having a multiple lens input unit:

(4) Change the convergence angle, i.e., the angle of intersection of the optical axes of the two image input devices 12 and 13; and (5) Change the baseline length, i.e., the distance between the optical axes of the two image input devices 12 and 13.

These methods also may be used in suitable combinations.

Figure 6C:
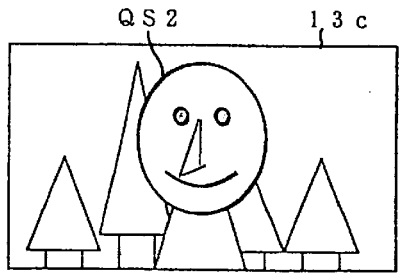

A user depresses the shutter button 155 when the dislocation of the two two-dimensional images has been minimized via the aforesaid methods, as in the overlay image QS2 shown in FIG. 6(c). In this way, the two-dimensional images QL and QR at this time are stored in the memories 152 and 153. Thereafter, the CPU 151 executes processing to reconstruct the three-dimensional data.

In FIG. 7, the two-dimensional images QL and QR input to the image input devices 12 and 13 are displayed on the display devices 12c and 13c (#11). When the position alignment button 154 is pressed, (#12: YES), the overlay image QS is displayed (#13). While viewing the overlay image QS, the user moves the camera 5 having a multiple lens input unit so as to minimize occlusion (#14), and at a suitable moment depresses the shutter button 155 to take the photograph (#15).

In this way, the camera 5 having a multiple lens input unit of the present invention takes the photograph while confirming the photographic conditions minimizing parallax. Accordingly, the accuracy of the search for correspondence points is improved, and accuracy is improved when reconstructing the three-dimensional shape. Moreover, the construction of the camera 5 having a multiple lens input unit is relatively simple.

Although three-dimensional data are generated in the camera 5 having a multiple lens input unit in the description above, the data of the two-dimensional images QL and QR input to the camera 5 having a multiple lens input unit may be transmitted to an information processing device 4, and the three-dimensional data may be generated in the information processing device 4. The two-dimensional images QL and QR, and the overlay image QS also may be displayed on the display device 22 of the information processing device 4.

Second Embodiment

A second embodiment is described below.

Figure 8A:
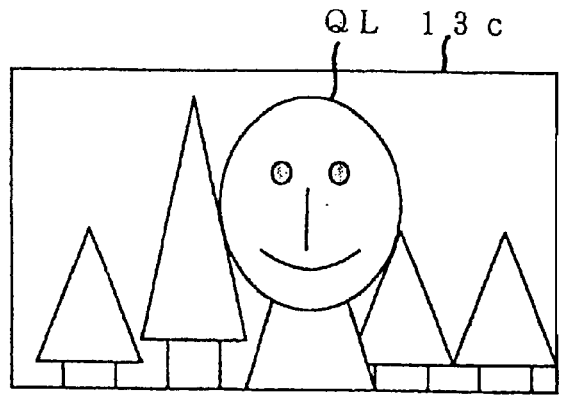
FIGS. 8 (*a*), 8(*b*), 8(*c*) and 8(*d*) show an example of an image displayed on the display device of a second embodiment.
Figure 8B:
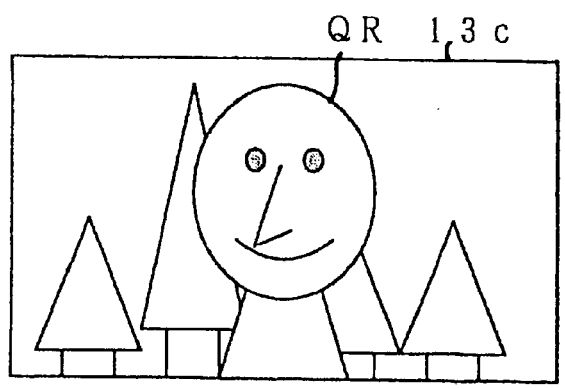
Figure 8C:
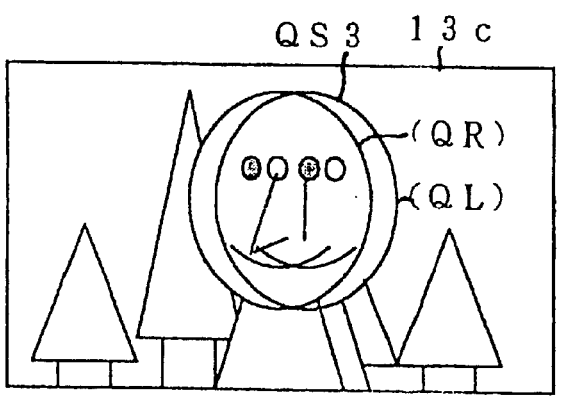
Figure 8D:
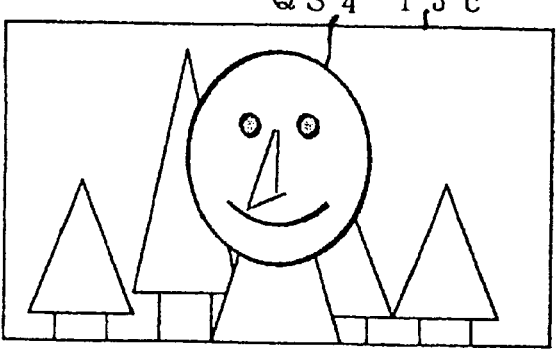
Figure 9:
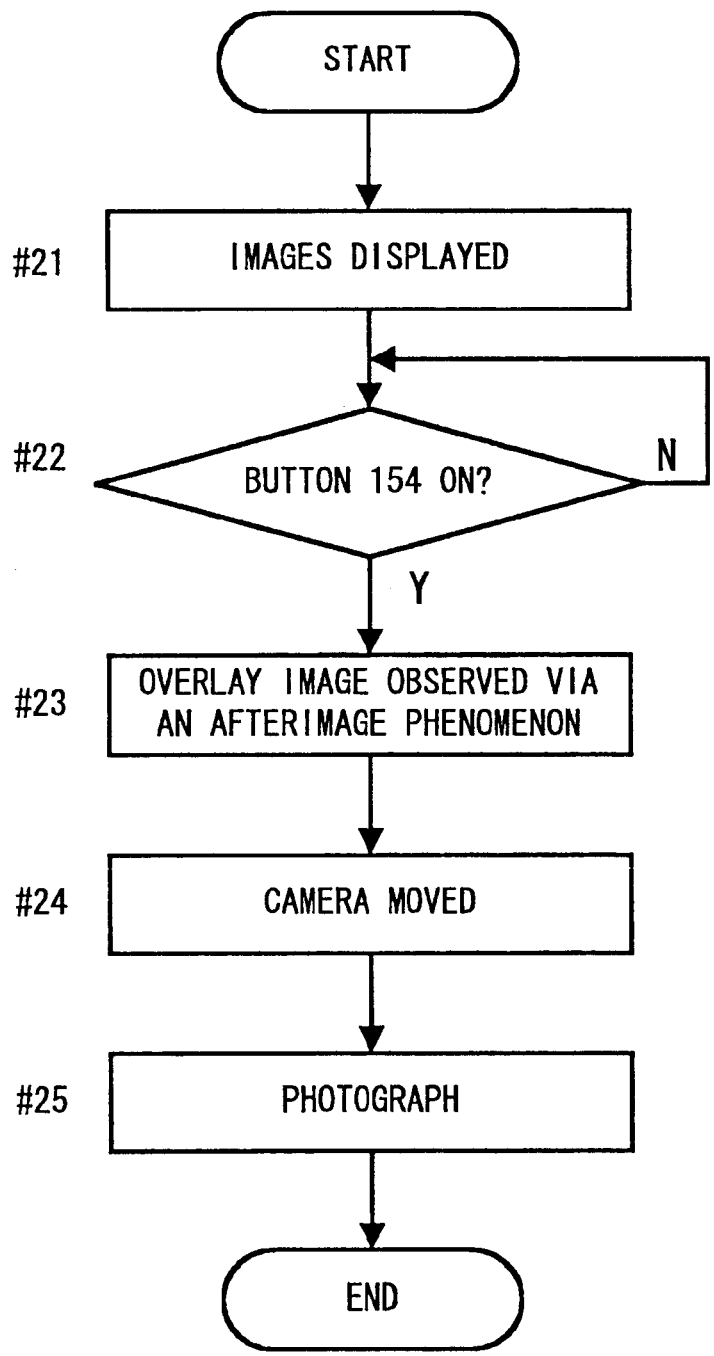
FIG. 9 is a flow chart briefly showing the operation of the camera having a multiple lens input unit of the second embodiment.

FIGS. 8(a)–8(d) show an example of an image displayed on the display device 13c of the second embodiment. FIG. 9 is a flow chart briefly showing the operation of the camera 5 having a multiple lens input unit of the second embodiment.

In the second embodiment, the construction of the three-dimensional data generator 1 is essentially the same as that of the first embodiment. Although, in the first embodiment, image data of ½ of the luminance values of the two two-dimensional images QL and QR are displayed simultaneously on the display device 13c as an overlay image QS, in the second embodiment, the luminance values of the two-dimensional images QL and QR are not changed, and the two two-dimensional images QL and QR are alternatingly displayed at fixed times. That is, the display time of each two-dimensional image QL and QR becomes ½. In this instance, the fixed display time is one in several tens of seconds, e.g., ⅟60, to ⅟30.

In FIG. 9, normally, the two-dimensional images QL and QR input to the image sensor elements 12b and 13b as shown in FIG. 6(a) are displayed on the display devices 12c and 13c, respectively (#21). When the position alignment button 154 is depressed (#22), the two-dimensional image QL shown in FIG. 8(a) and the two-dimensional image QR shown in FIG. 8(b) are alternatingly displayed on the display device 13c. When the user views the image displayed on the display device 13c, the overlay image QS3 shown in FIG. 8(c) is observed via an afterimage phenomenon (#23).

The overlay process is performed in the manner described below. The data of the two-dimensional images QL and QR stored in memories 152 and 153 are readout by the CPU 154, and respectively displayed on the display device 13c at fixed times.

The user moves the camera 5 having a multiple lens input unit so as to minimize the dislocation of the two two-dimensional images QL and QR while viewing the overlay image QS3 displayed on the display device 13c (#24). For example, the user depresses the shutter button 155 when the dislocation of the two two-dimensional images is minimized as in the overlay image QS4 shown in FIG. 8(d) (#25). As a result, when the shutter button 155 is depressed, the two-dimensional images, QL and QR are stored in memories 152 and 153.

As described above, in the second embodiment, the photograph is taken while confirming the photographic conditions such as minimized parallax without occlusion.

Third Embodiment

The third embodiment is described below.

Figure 10:
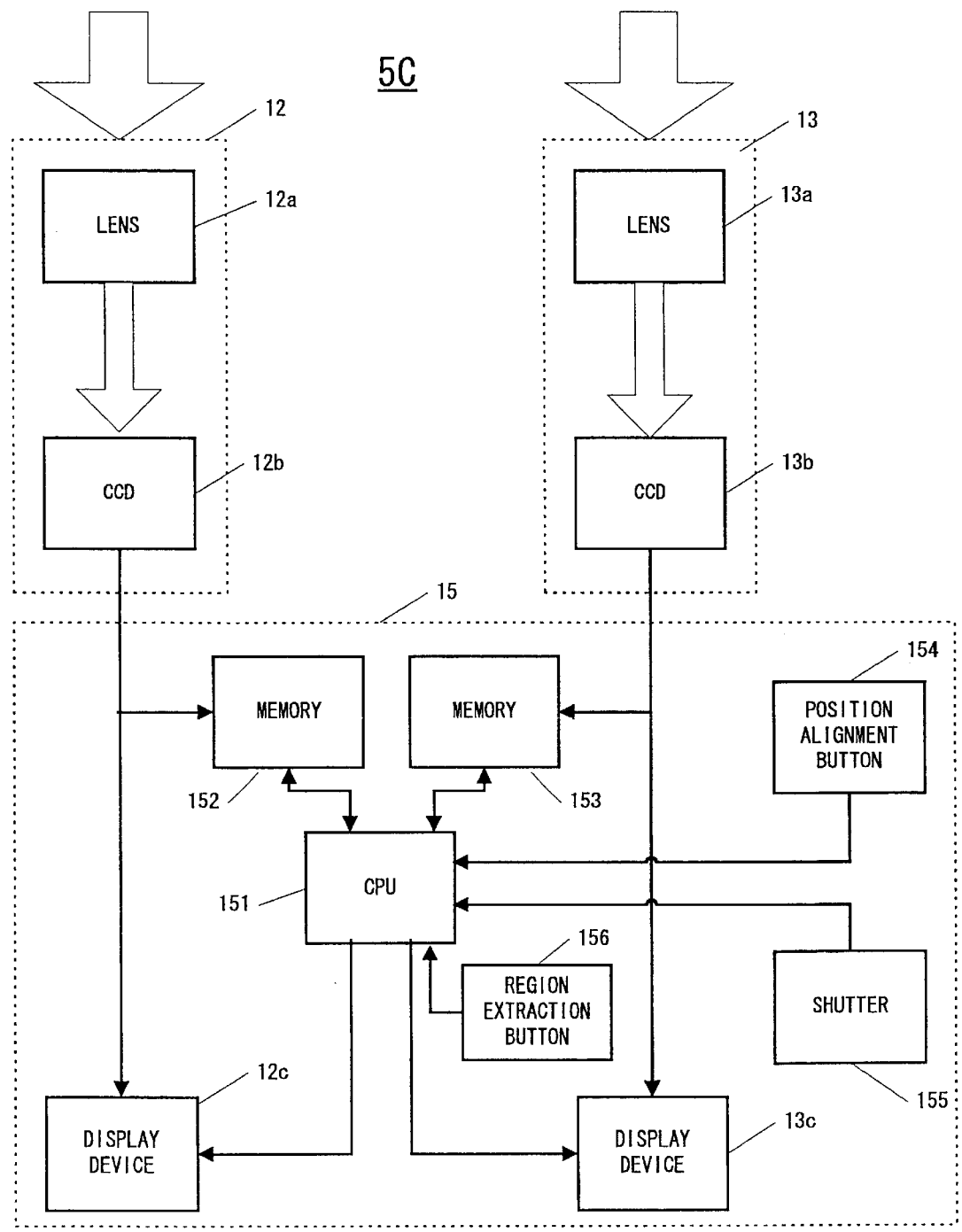
FIG. 10 is block diagram showing the structure of the camera having a multiple lens input unit of a third embodiment.

FIG. 10 is a block diagram showing the construction of a camera 5C having a multiple lens input unit of a third embodiment. FIGS. 11(a)–11(c) and 12(a)–12(b) show examples of images displayed on the display devices 12c and 13c. FIG. 13 is a flow chart briefly showing the operation of the camera 5C having a multiple lens input unit of the third embodiment.

In the third embodiment, the construction of the three-dimensional data generator 1 is essentially the same as that of the first embodiment. Although, in the first embodiment, not only the photographic subject Q but also the background QK are displayed on the display devices 12c and 13c, in the third embodiment, only the region of the photographic subject Q is extracted from the two-dimensional images QL and QR, and displayed on the display devices 12c and 13c.

In FIG. 10, camera 5C having a multiple lens input unit is provided with an additional region extraction button 156 relative to the camera 5C having a multiple lens input unit of the first embodiment. A region specified by a cursor on the display screen of the display devices 12c and 13c is selected as a region for extraction via the operation of the region extraction button 156. Although not shown in the drawing, a cursor button is provided for moving the cursor.

Figure 11A:
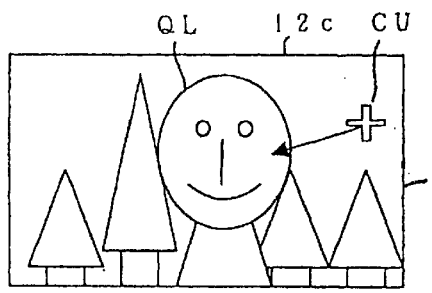
FIGS. 11(a), 11(b) and 11(c) show an example of an image displayed on the display device of the third embodiment.
Figure 11A:
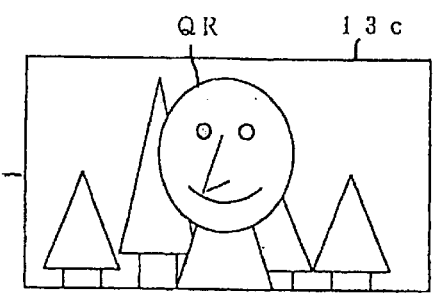
Figure 11B:
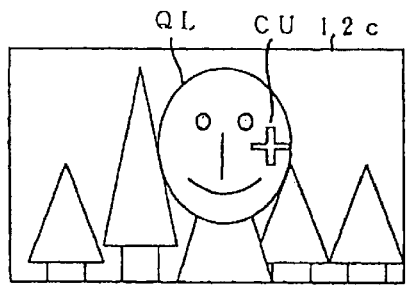

As shown in FIG. 11(a), normally, the two-dimensional images QL and QR input to the image sensor elements 12b and 13b are displayed on the display devices 12c and 13c. The cursor CU is displayed on the display device 12c. In this state, the user aligns the cursor CU with the photographic subject Q, as shown in FIG. 11(b). When the region extraction button 156 is depressed, the right and left two-dimensional images QL and QR are subjected to an extraction process to obtain the extracted images QLE and QRE. The extraction process is executed by the CPU 151.

Figure 11C:
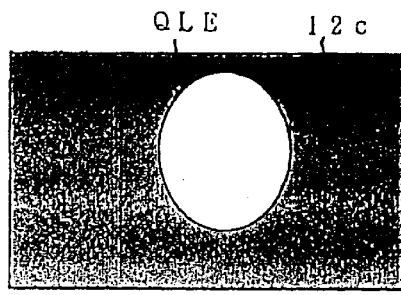
Figure 11C:
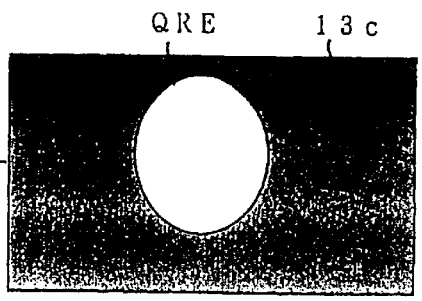

The extraction process extracts the regions having the same color information as the area selected by the cursor CU based on the color information of the area indicated by the cursor CU, and these regions are designated extracted images QLE and QRE. In the example of FIG. 11, the area of the face of the photographic subject Q are the extracted images QLE and QRE. As shown in FIG. 11(c), the extracted images QLE and QRE are displayed on the display devices 12c and 13c. The extracted images QLE and QRE are two-dimensional images of the extracted region, and may show the region alone.

Figure 12A:
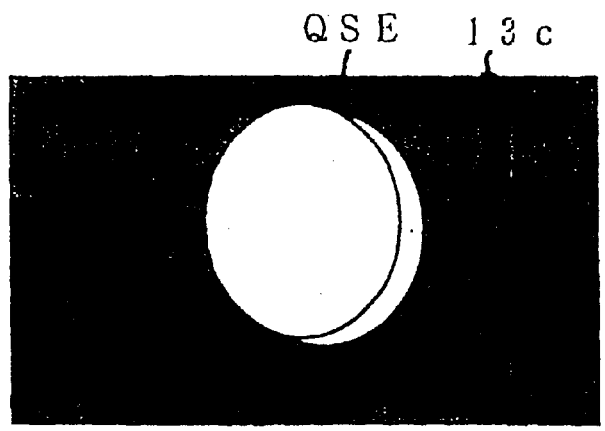
FIGS. 12(a) and 12(b) show an example of an image displayed on the display device of a second embodiment.
Figure 12B:
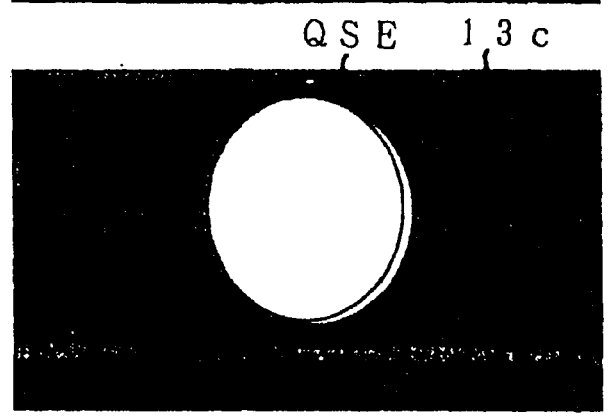
Figure 13:
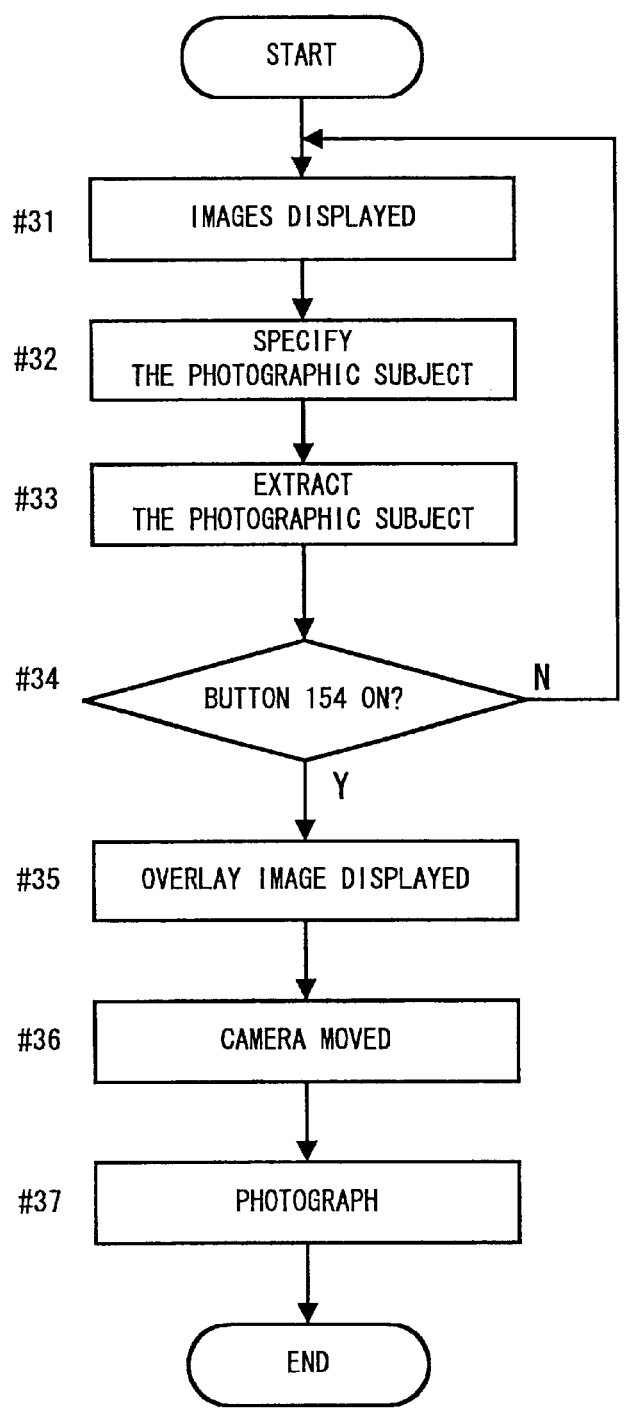
FIG. 13 is a flow chart briefly showing the operation of the camera having a multiple lens input unit of the third embodiment.

When the position alignment button 154 is depressed, the two extracted images QLE and QRE are superimposed as shown in FIGS. 12(a) and 12(b), and the obtained overlay image QSE is displayed on the display device 13c. In the overlay of this instance, the two extracted images QLE and QRE are displayed simultaneously as in the first embodiment. The user moves the camera 5 having a multiple lens input unit so as to reduce occlusion while viewing the overlay image QSE. The process for reconstructing three-dimensional data is executed for only the extracted images QLE and QRE.

In FIG. 13, when the region extraction button 156 is depressed to specify the photographic subject Q after the two-dimensional images QL and QR are displayed on the display devices 12c and 13c (#31), the photographic subject Q is extracted (#32, #33). When the position alignment button 154 is depressed (#34: YES), the overlay image QSE is displayed (#35). The user moves the camera 5 having a multiple lens input unit so as to reduce occlusion while viewing the overlay image QSE (#36), and the photograph is taken when the shutter button 55 is depressed at a suitable moment (#37).

In the third embodiment, only the region of the photographic subject Q is displayed and the background QK is erased, thereby making the images more readily visible to the user and facilitating the operation to reduce image dislocation. Since the generation of three-dimensional data is performed only on the region of the photographic subject Q, needless calculation is avoided and processing time is shortened. The user is able to take the photograph while confirming the photographic conditions to minimize parallax without occlusion.

Fourth Embodiment

The fourth embodiment is described below.

The construction of the three-dimensional data generator 1 of the fourth embodiment is essentially the same as that of the third embodiment. In the fourth embodiment, only the region of the subject Q is extracted from the two-dimensional images QL and QR, and the two-dimensional images QL and QR are alternatingly displayed on the display devices 12c and 13c at fixed times. That is, the fourth embodiment combines aspects of the second embodiment and the third embodiment.

In the fourth embodiment, the two-dimensional images QL and QR are subjected to an extraction process identical to that of the third embodiment when the region extraction button 156 is depressed, so as to obtain extracted images QLE and QRE. The two extracted images QLE and QRE are alternatingly displayed at fixed times in the same manner as in the second embodiment when the position alignment button 154 is depressed. The user moves the camera 5C having a multiple lens input unit so as to reduce occlusion while viewing the overlay image QSE.

The modifications described below may be combined in the first through fourth embodiments described above.

Fifth Embodiment

Figure 14:
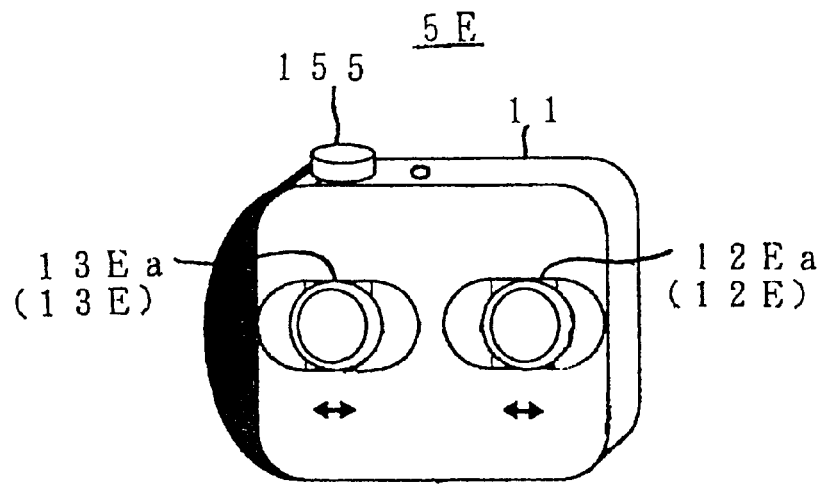
FIG. 14 is a perspective view of a camera having a multiple lens input unit of a fifth embodiment.

FIG. 14 is a perspective view of a camera 5E having a multiple lens input unit of a fifth embodiment.

As shown in FIG. 14, the image input units 12E and 13E of the camera 5E having a multiple lens input unit are provided with taking lenses 12Ea and 13Ea which are laterally movable. The baseline length is changed by moving the taking lenses 13Ea and 13Ea in lateral directions.

Accordingly, adjustment is easily made via changing the baseline length so as to minimize the dislocation of the two two-dimensional images QL and QR, or extracted images QLE and QRE. This camera 5E having a multiple lens input unit is adaptable to the first through fourth embodiments.

Sixth Embodiment

Figure 15:
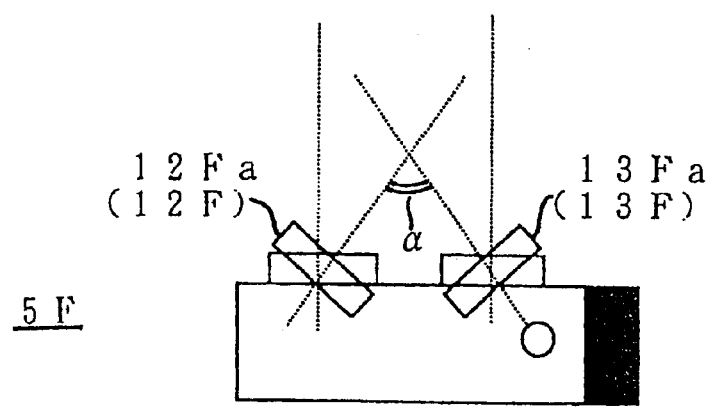
FIG. 15 is a perspective view of a camera having a multiple lens input unit of a sixth embodiment.

FIG. 15 is a perspective view of a camera 5F having a multiple lens input unit of a sixth embodiment.

As shown in FIG. 15, the image input units 12F and 13F of the camera 5F having a multiple lens input unit are provided with taking lenses 12Fa and 13Fa capable of variable photographic direction within a horizontal plane. The convergence angle a is changed by changing the photographic direction.

Accordingly, adjustment is easily made via changing the convergence angle a so as to minimize the dislocation of the two two-dimensional images QL and QR, or extracted images QLE and QRE. This camera 5F having a multiple lens input unit is adaptable to the first through fifth embodiments.

Seventh Embodiment

Figure 16:
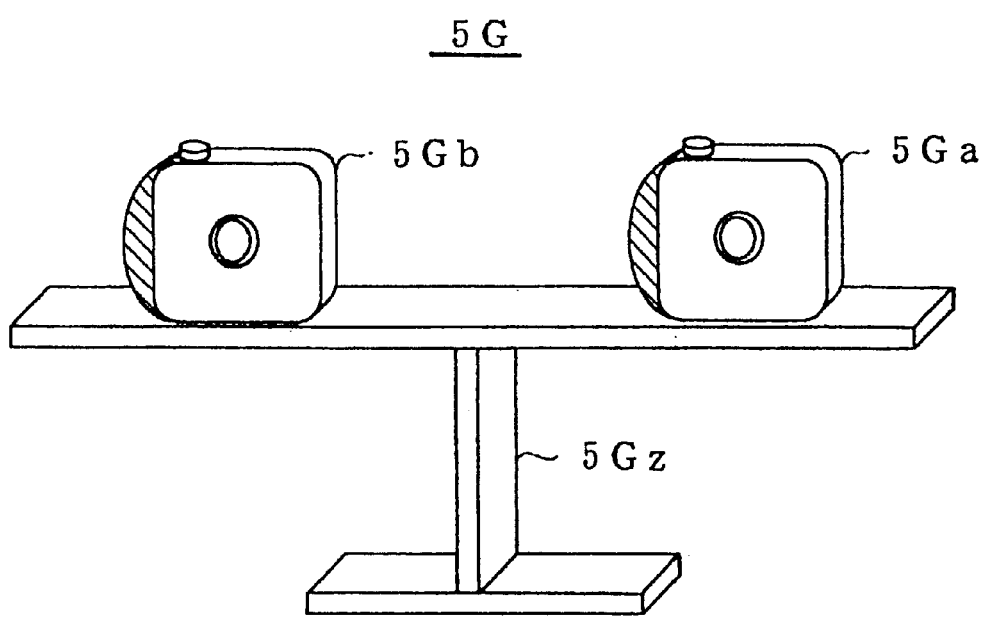
FIG. 16 is a perspective view of a camera having a multiple lens input unit of a seventh embodiment.

FIG. 16 is a perspective view of a camera 5G having a multiple lens input unit of a seventh embodiment.

As shown in FIG. 16, the camera 5G having a multiple lens input unit comprises a plurality of single lens cameras 5Ga and 5Gb, and a base 5Gz. The baseline length and the convergence angle α can be optionally set by adjusting the installation position and photographic direction of the cameras 5Ga and 5Gb. This camera 5G having a multiple lens input unit is adaptable to the first through the fourth embodiments.

Although the embodiments above have been described in terms of inputting still images as the two-dimensional images QL and QR, but it is possible use an identical adaptation for inputting moving images as the two-dimensional images QL and QR. The construction shape, material, processing content and sequence of the information processing device 4, camera 5, 5C, 5E, 5F, 5G having a multiple lens input unit, and the three-dimensional data generator 1 may be modified and adapted in whole or in part within the scope of the present invention.

As described above, the present invention takes photographs while confirming photographic conditions to reduce parallax without occlusion via a simple construction. Accordingly, the present invention improves the accuracy of the correspondence point search, and improves accuracy when reconstructing the three-dimensional shape.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A data input apparatus having a lens unit including a plurality of lens systems, comprising:
    an image input device for inputting two-dimensional images of a photographic subject from a plurality of mutually different viewpoint positions;
    a display for displaying two-dimensional images input by the image input device; and
    a controller for displaying on the display an image formed by mutually overlaying a plurality of two-dimensional images input by the image input device.

2. The data input apparatus according to claim 1, further comprising a calculator for calculating three-dimensional data of a photographic subject based on the two-dimensional images.

3. The data input apparatus according to claim 1, wherein said image input device includes two image sensor elements, and
    further comprising means for changing baseline length between said image sensor elements.

4. The data input apparatus according to claim 1, wherein said image input device includes a camera for inputting two-dimensional images of a photographic subject from a plurality of mutually different viewpoint positions, and wherein said data input device further comprising means for changing a direction in which photographs are taken.

5. The data input apparatus according to claim 1, wherein said controller simultaneously displays a plurality of two-dimensional images on the display.

6. The data input apparatus according to claim 1, wherein said controller alternates between displaying each of a plurality of two-dimensional images on the display at fixed periods.

7. The data input apparatus according to claim 1, further comprising an extractor for extracting from the two-dimensional images areas targeted as the object of three-dimensional data calculation in the photographic subject, wherein the controller displays on the display an image formed by mutually overlaying the extracted two-dimensional images.

8. A camera having a lens input unit including a plurality of lens systems, comprising:
    image input units respectively including a taking lens and image sensor elements, said image input units taking two-dimensional images of a photographic subject from a plurality of mutually different viewpoint positions;
    a processing circuit; and
    display device;
    wherein a photographic subject is photographed with parallax via said taking lenses and is displayed as two-dimensional images on said display device.

9. The camera according to claim 8, wherein said image sensor elements selected from a group of sensor elements consisting of monochrome and color sensor elements.

10. The camera according to claim 8, wherein said processing circuit comprises a CPU and memories corresponding in number to said image sensor elements and which store images from respective image sensor elements.

11. The camera according to claim 8, further comprising a position alignment button, wherein said display device includes two displays, one of said displays displays an image from one of said image sensor elements, and another of said image displays displays an image from another of said image sensor elements and displays an overlay image of the one and the other images superimposed on each other when said position alignment button is pressed.

12. The camera according to claim 8, wherein said image input units include means for changing said mutually different viewpoint positions of the image sensor elements according to one or more of the following methods:
    changing an angle of intersection of the optical axes of the image input devices; and
    changing the baseline length between the optical axes of the image input devices.

13. The camera according to claim 8, wherein said image display is a single display alternately displaying images from said image sensor elements.

14. The camera according to claim 8, further comprising an additional region extraction button used to extract a region of the photographic subject.

15. A three-dimensional data generator, comprising:
    an information processing device; and
    a camera in accordance with claim 8.

16. A method of reducing image dislocation in a data input apparatus having an image input device including a lens unit, said lens unit including a plurality of lens systems for inputting at least two-dimensional images of a photographic subject from a plurality of mutually different viewpoint positions comprising the steps of:
    displaying two-dimensional images input to image input devices on the display devices;

displaying an overlay image of said two-dimensional images;

while viewing the overlay image, moving at least said image input devices so as to minimize occlusion in said overlay image; and when occlusion has been reduced, taking a photograph.

17. The method according to claim 16, further comprising:

conducting a search for correspondence points between said two dimensional images; and reconstructing a three-dimensional shape from said two dimensional images.

18. The method according to claim 16, wherein said step of moving at least said image input devices includes one or more of the following method steps:

changing an angle of intersection of the optical axes of the image input devices; and changing the baseline length between the optical axes of the image input devices.

19. A data input apparatus, comprising:

an image input device, including two lens systems, which obtains two images object, each image is captured by the two lens systems respectively;

a display device;

an instruction device which instructs recording images in a memory;

a controller which controls the image input device and the display to successively display an overlaid image of two images on the display device obtained by the lens system until instruction for recording is given by the instruction device.

* * * * *